United States Patent
Chen et al.

(10) Patent No.: US 10,090,309 B1
(45) Date of Patent: Oct. 2, 2018

(54) NONVOLATILE MEMORY CELL CAPABLE OF IMPROVING PROGRAM PERFORMANCE

(71) Applicant: eMemory Technology Inc., Hsin-Chu (TW)

(72) Inventors: Kuan-Hsun Chen, Tainan (TW); Ting-Ting Su, Taipei (TW)

(73) Assignee: eMemory Technology Inc., Hsin-Chu (TW)

( * ) Notice: Subject to any disclaimer, the term of this patent is extended or adjusted under 35 U.S.C. 154(b) by 0 days.

(21) Appl. No.: 15/640,575

(22) Filed: Jul. 2, 2017

Related U.S. Application Data

(60) Provisional application No. 62/490,612, filed on Apr. 27, 2017.

(51) Int. Cl.
*H01L 29/94* (2006.01)
*H01L 27/112* (2006.01)
*H01L 27/06* (2006.01)

(52) U.S. Cl.
CPC .... *H01L 27/11206* (2013.01); *H01L 27/0629* (2013.01)

(58) Field of Classification Search
CPC .................. H01L 27/11206; H01L 27/0629
See application file for complete search history.

(56) References Cited

U.S. PATENT DOCUMENTS

| | | |
|---|---|---|
| 5,514,608 A | 5/1996 | Williams |
| 7,221,021 B2 | 5/2007 | Wu |
| 2012/0211841 A1* | 8/2012 | Kurjanowicz ......... G11C 17/16 257/369 |
| 2014/0008724 A1* | 1/2014 | Chou .................... H01L 27/088 257/337 |
| 2014/0340955 A1* | 11/2014 | Wu .................... H01L 27/11206 365/104 |
| 2016/0013199 A1 | 1/2016 | Hsu |
| 2016/0141295 A1 | 5/2016 | Wu |
| 2017/0076757 A1 | 3/2017 | Wu |

FOREIGN PATENT DOCUMENTS

| | | |
|---|---|---|
| TW | 201445674 A | 12/2014 |
| TW | 201614505 A | 4/2016 |

* cited by examiner

*Primary Examiner* — Mohsen Ahmadi
*Assistant Examiner* — Wasiul Haider
(74) *Attorney, Agent, or Firm* — Winston Hsu

(57) ABSTRACT

A non-volatile memory cell is disclosed. A select gate transistor, a following gate transistor, and an antifuse varactor are coupled in series on an active area. The following gate transistor is disposed between the select gate transistor and the antifuse varactor. A first ion well and a second ion well having the first conductivity type are provided in the active area. The following gate transistor partially overlaps with the first ion well. The second ion well has a doping concentration that is smaller than that of the first ion well.

20 Claims, 6 Drawing Sheets

NONVOLATILE MEMORY CELL CAPABLE OF IMPROVING PROGRAM PERFORMANCE

CROSS REFERENCE TO RELATED APPLICATIONS

This application claims the benefit of U.S. provisional application No. 62/490,612 filed Apr. 27, 2017.

BACKGROUND OF THE INVENTION

1. Field of the Invention

The present invention relates to a nonvolatile memory cell and, more particularly, to a one-time programmable (OTP) memory cell capable of improving program performance.

2. Description of the Prior Art

Non-volatile memory (NVM) is a type of memory that retains information it stores even when no power is supplied to memory blocks thereof. Some examples include magnetic devices, optical discs, flash memory, and other semiconductor-based memory topologies. According to the programming times limit, non-volatile memory devices are divided into multi-time programmable (MTP) memory and one-time programmable (OTP) memory.

Generally, the MTP memory may be programmed many times, and the stored data of the MTP memory may be modified many times. On the contrary, the OTP memory may be programmed once. The OTP memories may be classified into two types, i.e. a fuse type OTP memory and an anti-fuse type OTP memory.

SUMMARY OF THE INVENTION

It is one object of the invention to provide a one-time programmable (OTP) memory cell capable of improving program performance.

According to one embodiment, a non-volatile memory cell includes a silicon substrate having a first conductivity type. The silicon substrate includes an active area surrounded by a trench isolation region. A select gate transistor, a following gate transistor, and an antifuse varactor are coupled in series on the active area. The following gate transistor is disposed between the select gate transistor and the antifuse varactor. A first ion well having the first conductivity type is provided in the active area. The following gate transistor partially overlaps with the first ion well. A second ion well having the first conductivity type is provided in the active area and is in contiguous with the first ion well. The second ion well has a doping concentration that is smaller than that of the first ion well.

According to one embodiment, the select gate transistor comprises a word line gate, a select gate oxide layer between the word line gate and the active area, a source doped region disposed on one side of the word line gate, a first source/drain doped region disposed on the other side of the word line gate, a first source/drain extension region coupled to the source doped region, a second source/drain extension region coupled to the first source/drain doped region, and a select gate channel between the first source/drain extension region and the second source/drain extension region. The source doped region is electrically coupled to a bit line.

According to one embodiment, the source doped region and the first source/drain doped region have a second conductivity type that is opposite to the first conductivity type.

According to one embodiment, the source doped region and the first source/drain doped region are both disposed within the first ion well.

According to one embodiment, the following gate transistor comprises a following gate, a following gate oxide layer between the following gate and the active area, the first source/drain doped region adjacent to the following gate, a second source/drain doped region opposite to the first source/drain doped region, a third source/drain extension region coupled to the first source/drain doped region, a fourth source/drain extension region coupled to the second source/drain doped region, and a following gate channel between the third source/drain extension region and the fourth source/drain extension region.

According to one embodiment, the first source/drain doped region and the third source/drain extension region coupled to the first source/drain doped region are disposed within the first ion well.

According to one embodiment, the second source/drain doped region and the fourth source/drain extension region coupled to the second source/drain doped region are disposed within the second ion well.

According to one embodiment, the second source/drain doped region has the second conductivity type.

According to one embodiment, the following gate channel is composed of a portion of the first ion well and a portion of the second ion well.

According to one embodiment, the antifuse varactor comprises an antifuse gate, an antifuse gate oxide layer between the antifuse gate and the active area, the second source/drain doped region adjacent to the antifuse gate, a drain doped region opposite to the second source/drain doped region, a fifth source/drain extension region coupled with the second source/drain doped region, and a sixth source/drain extension region coupled with the drain doped region.

According to one embodiment, the fifth source/drain extension region merges with the sixth source/drain extension region underneath the antifuse gate.

According to one embodiment, the second source/drain doped region, the fifth source/drain extension region, the sixth source/drain extension region, and the drain doped region are disposed within the second ion well.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute a part of this specification. The drawings illustrate some of the embodiments and, together with the description, serve to explain their principles. In the drawings.

Figure 1:
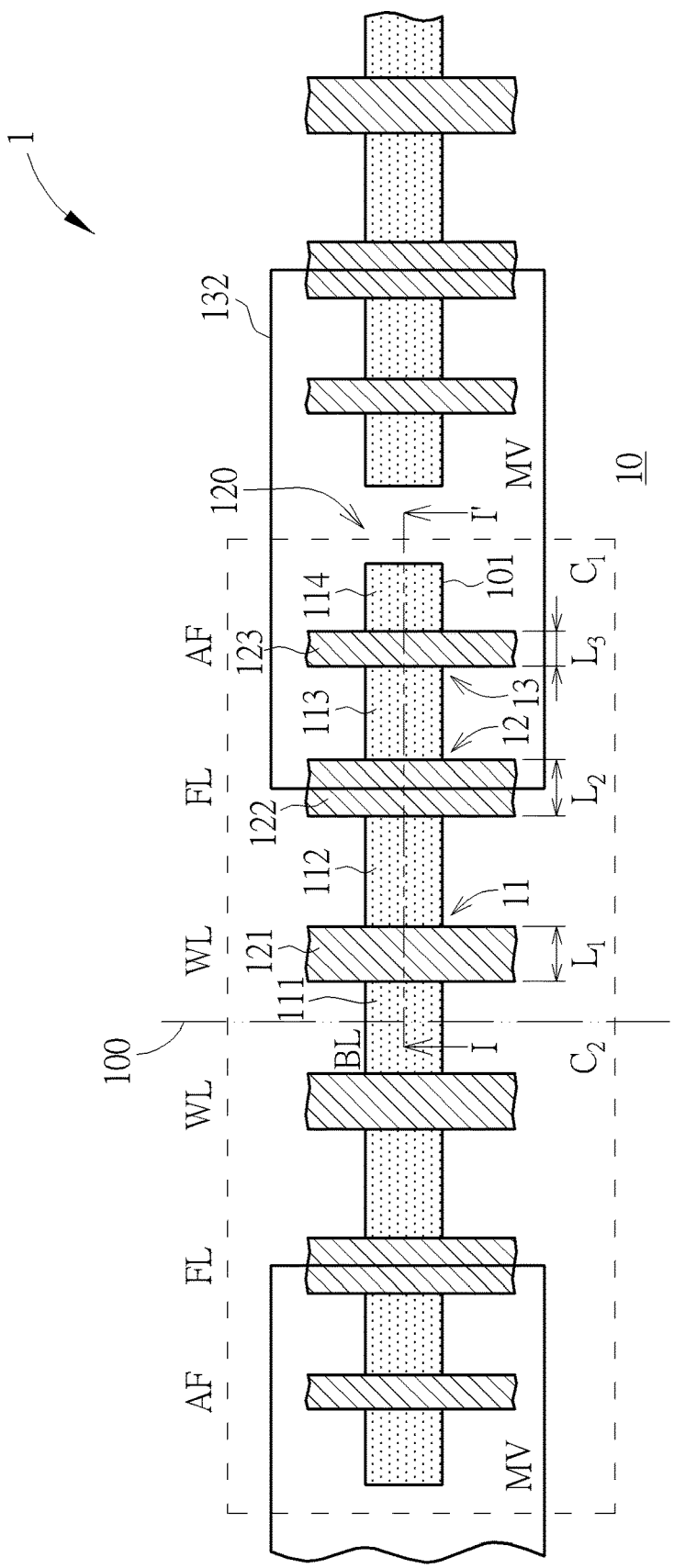
FIG. 1 is a schematic layout diagram showing a portion of a memory array including two exemplary single-poly non-volatile memory cells $C_1$ and $C_2$ according to one embodiment of the invention.

It should be noted that all the figures are diagrammatic. Relative dimensions and proportions of parts of the drawings are exaggerated or reduced in size, for the sake of clarity and convenience. The same reference signs are generally used to refer to corresponding or similar features in modified and different embodiments.

DETAILED DESCRIPTION

In the following description, numerous specific details are given to provide a thorough understanding of the invention. It will, however, be apparent to one skilled in the art that the invention may be practiced without these specific details. Furthermore, some well-known system configurations or process steps are not disclosed in detail, as these should be well-known to those skilled in the art.

Likewise, the drawings showing embodiments of the apparatus are semi-diagrammatic and not to scale and some dimensions are exaggerated in the figures for clarity of presentation. Also, where multiple embodiments are disclosed and described as having some features in common, like or similar features will usually be described with like reference numerals for ease of illustration and description thereof.

The present invention pertains to a low-voltage NMOS antifuse memory cell that is capable of sustaining higher program voltage ($V_{PP}$). The low-voltage NMOS antifuse memory cell is a single-poly nonvolatile memory cell and may function as a one-time programmable (OTP) memory cell capable of improving program performance. The low-voltage NMOS antifuse memory cell may be fabricated on a bulk silicon substrate according to one embodiment of the invention. In another embodiment, the low-voltage NMOS antifuse memory cell may be fabricated on an SOI (silicon-on-insulator) substrate.

Figure 2:
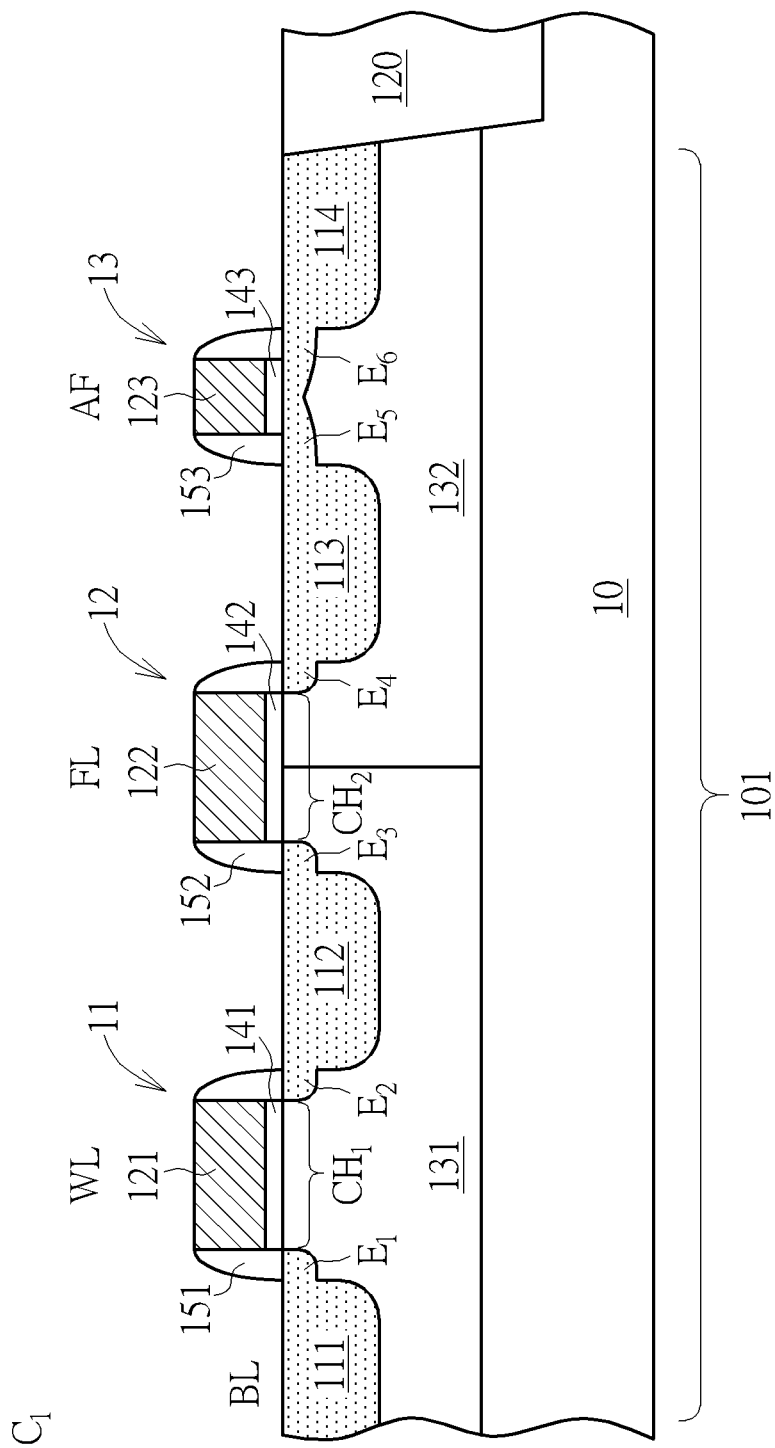
FIG. 2 is a schematic, cross-sectional view taken along line I-I' in FIG. 1.

Please refer to FIG. 1 and FIG. 2. FIG. 1 is a schematic layout diagram showing a portion of a memory array including two exemplary single-poly non-volatile memory cells $C_1$ and $C_2$ according to one embodiment of the invention. FIG. 2 is a schematic, cross-sectional view taken along line I-I' in FIG. 1. As shown in FIG. 1 and FIG. 2, the memory array 1 comprises at least two single-poly non-volatile memory (NVM) cells $C_1$ and $C_2$, which are indicated by dashed line. According to one embodiment of the invention, the NVM cell $C_1$ and the NVM cell $C_2$ are mirror-symmetric to each other with respect to the central dashed line 100. According to one embodiment of the invention, the NVM cell $C_1$ and the NVM cell $C_2$ may share one common source doped region 111, but is not limited thereto.

It is understood that the memory array 1 comprises multiple memory cells. For the sake of simplicity, only the NVM cell $C_1$ and the NVM cell $C_2$ are illustrated.

The NVM cell $C_1$ and the NVM cell $C_2$ may be fabricated on a bulk silicon substrate 10 having a first conductivity type, for example, P type. According to one embodiment of the invention, the bulk silicon substrate 10 may be a P type doped silicon substrate. According to one embodiment of the invention, the NVM cell $C_1$ and the NVM cell $C_2$ may be fabricated on a stripe shaped active area 101 of the silicon substrate 10 surrounded by a shallow trench isolation (STI) region 120.

For example, according to one embodiment of the invention, the NVM cell $C_1$ comprises a select gate transistor 11, a following gate transistor 12, and an antifuse varactor 13 coupled in series on the active area 101, wherein the following gate transistor 12 is disposed between the select gate transistor 11 and the antifuse varactor 13.

As can be best seen in FIG. 2, the NVM cell $C_1$ comprises a first ion well 131 having the first conductivity type in the active area 101 and a second ion well 132 having the first conductivity type in the active area 101. The second ion well 132 is in contiguous with the first ion well 131. According to one embodiment of the invention, the following gate transistor 12 partially overlaps with the first ion well 131. According to one embodiment of the invention, the following gate transistor 12 also partially overlaps with the second ion well 132.

According to one embodiment of the invention, the second ion well 132 has a doping concentration that is smaller than that of the first ion well 131. For example, the second ion well 132 may be a medium-voltage P well (MV P well or MVPW) as that normally used in the logic core circuit region and may have a doping concentration of about $1E10$ atoms/cm$^3$. For example, the first ion well 131 may be a low-voltage P well (LV P well or LVPW) as that normally used in the logic core circuit region and may have a doping concentration of about $1E11$ atoms/cm$^3$.

According to one embodiment of the invention, the select gate transistor 11 is disposed within the first ion well 131. According to one embodiment of the invention, the antifuse varactor 13 is disposed within the second ion well 132.

According to one embodiment of the invention, the select gate transistor 11 comprises a word line gate 121 that is coupled to a word line (WL) in the memory array 1, and a select gate oxide layer 141 between the word line gate 121 and the active area 101. According to one embodiment of the invention, a sidewall spacer 151 may be provided on each sidewall of the word line gate 121. As shown in FIG. 1, the word line gate 121 may have a gate length $L_1$.

According to one embodiment of the invention, the select gate transistor 11 may have the same transistor structure as a low-voltage core device used in the low-voltage core circuit, but is not limited thereto. According to another embodiment of the invention, the select gate transistor 11 may have the same transistor structure as a medium-voltage input/output (I/O) device used in the medium-voltage I/O circuit, but is not limited thereto.

According to one embodiment of the invention, the select gate transistor 11 further comprises a source doped region 111 disposed on one side of the word line gate 121, a first source/drain doped region 112 disposed on the other side of the word line gate 121, a first source/drain extension region $E_1$ such as an NLDD coupled to the source doped region 111, a second source/drain extension region $E_2$ such as an NLDD coupled to the first source/drain doped region 112, and a select gate channel $CH_1$ between the first source/drain extension region $E_1$ and the second source/drain extension region $E_2$.

According to one embodiment of the invention, the source doped region 111 and the first source/drain doped region 112 may have a second conductivity type that is opposite to the first conductivity type. For example, the source doped region 111 and the first source/drain doped region 112 may be N' doped regions. According to one embodiment of the invention, the select gate transistor 11 is an NMOS transistor.

According to one embodiment of the invention, the source doped region 111 is electrically coupled to a bit line (BL). According to one embodiment of the invention, the first source/drain doped region 112 is electrically floating during program or read operations.

According to one embodiment of the invention, the following gate transistor 12 comprises a following gate 122 that is coupled to a following gate line (FL) in the memory array 1, and a following gate oxide layer 142 between the following gate 122 and the active area 101. The following gate 122 is disposed directly above a portion of the first ion well 131 and a portion of the second ion well 132.

According to one embodiment of the invention, a sidewall spacer 152 may be provided on each sidewall of the following gate 122. As shown in FIG. 1, the following gate 122 may have a gate length $L_2$ that is substantially equal to the gate length $L_1$.

According to one embodiment of the invention, the following gate transistor 12 may have the same transistor structure as a low-voltage core device used in the low-voltage core circuit, but is not limited thereto.

According to another embodiment of the invention, the following gate transistor 12 may have the same transistor structure as a medium-voltage input/output (I/O) device used in the medium-voltage I/O circuit, but is not limited thereto. The thickness of the select gate oxide layer 141 and the thickness of the following gate oxide layer 142 may be thicker than that of the antifuse fuse gate oxide 143.

According to one embodiment of the invention, the thickness of the following gate oxide layer 142 may be substantially equal to the thickness of the select gate oxide layer 141.

According to one embodiment of the invention, the following gate transistor 12 further comprises the first source/drain doped region 112 adjacent to the following gate 122, a second source/drain doped region 113 opposite to the first source/drain doped region 112, a third source/drain extension region $E_3$ such as an NLDD coupled to the first source/drain doped region 112, a fourth source/drain extension region $E_4$ such as an NLDD coupled to the second source/drain doped region 113, and a following gate channel $CH_2$ between the third source/drain extension region $E_3$ and the fourth source/drain extension region $E_4$. According to one embodiment of the invention, the following gate channel $CH_2$ is composed of a portion of the first ion well 131 and a portion of the second ion well 132.

According to one embodiment of the invention, the first source/drain doped region 112 is commonly shared by the select gate transistor 11 and the following gate transistor 12, such that the select gate transistor 11 is series connected to the following gate transistor 12.

According to one embodiment of the invention, the first source/drain doped region 112 and the third source/drain extension region $E_3$ coupled to the first source/drain doped region 112 are disposed within the first ion well 131. According to one embodiment of the invention, the second source/drain doped region 113 and the fourth source/drain extension region $E_4$ coupled to the second source/drain doped region 113 are disposed within the second ion well 132.

According to one embodiment of the invention, the second source/drain doped region 113 may have the second conductivity type that is opposite to the first conductivity type. For example, the second source/drain doped region 113 may be an N' doped region. According to one embodiment of the invention, the following gate transistor 12 is an NMOS transistor.

According to one embodiment of the invention, the antifuse varactor 13 comprises an antifuse gate 123 and an antifuse gate oxide layer 143 between the antifuse gate 123 and the active area 101. According to one embodiment of the invention, a sidewall spacer 153 may be provided on each sidewall of the antifuse gate 123. As shown in FIG. 1, the antifuse gate 123 may have a gate length $L_3$ that is smaller than the gate length $L_1$ or $L_2$.

According to one embodiment of the invention, the antifuse varactor 13 further comprises the second source/drain doped region 113 adjacent to the antifuse gate 123, a drain doped region 114 opposite to the second source/drain doped region 113, a fifth source/drain extension region $E_5$ such as an NLDD coupled with the second source/drain doped region 113, and a sixth source/drain extension region $E_6$ such as an NLDD coupled with the drain doped region 114. The drain doped region 114 has the second conductivity type that is opposite to the first conductivity type. For example, the drain doped region 114 may be an $N^+$ doped region. However, in other embodiments, the drain doped region 114 may be omitted.

According to one embodiment of the invention, the fifth source/drain extension region $E_5$ may merge with the sixth source/drain extension region $E_6$ underneath the antifuse gate 123. Therefore, there is no channel region directly under the antifuse gate 123. In another embodiment, the fifth source/drain extension region $E_5$ may not merge with the sixth source/drain extension region $E_6$ underneath the antifuse gate 123.

According to one embodiment of the invention, the second source/drain doped region 113, the fifth source/drain extension region $E_5$, the sixth source/drain extension region $E_5$, and the drain doped region 114 are disposed within the second ion well 132. According to one embodiment of the invention, the first source/drain doped region 112, the second source/drain doped region 113, and the drain doped region 114 are electrically floating during program or read operations.

When operated under a program mode, the antifuse gate 123 may be coupled to a relatively high voltage $V_{PP}$, such as 9V or higher voltages. By introducing the second ion well 132 and disposing the antifuse varactor 13 within the second ion well 132, the antifuse gate 123 is able to sustain high voltages during operation.

Figure 3:
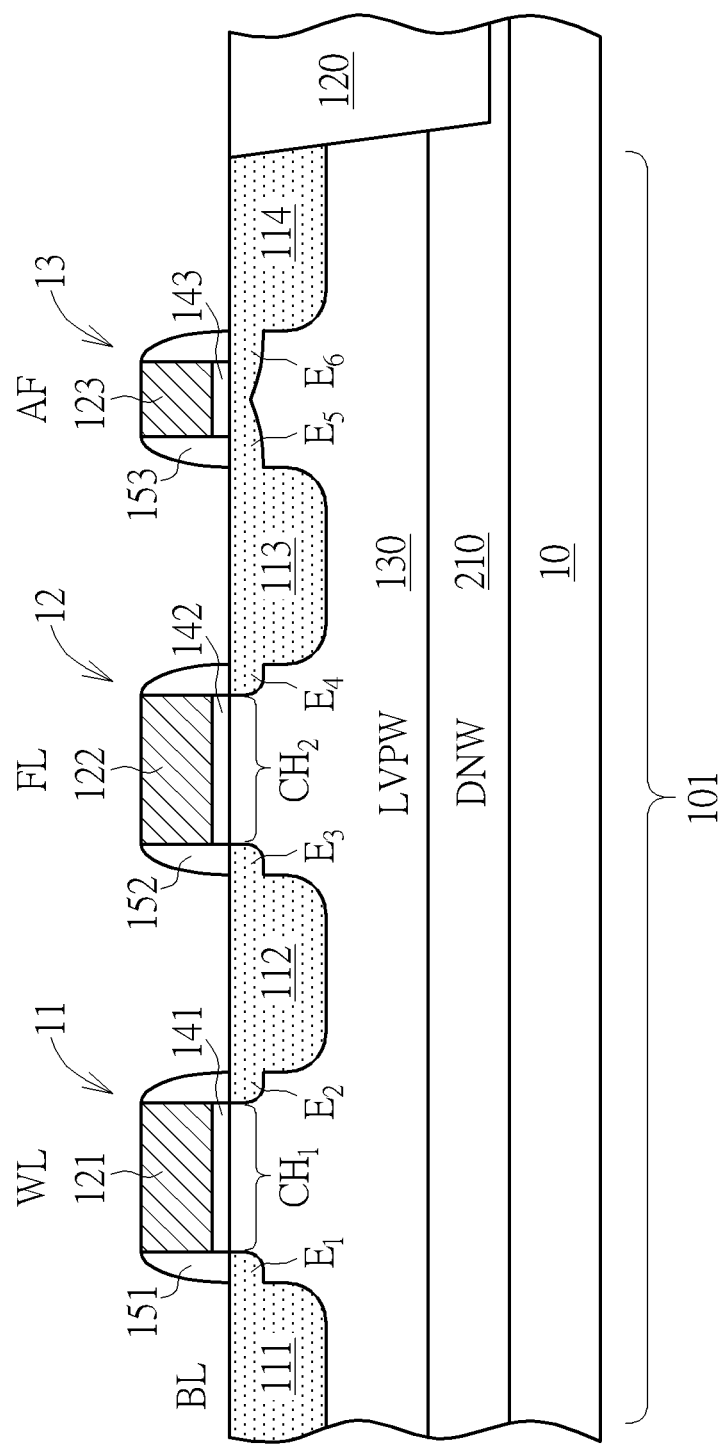
FIG. 3 is a schematic, cross-sectional diagram showing a single-poly nonvolatile memory cell according to another embodiment.

Please refer to FIG. 3. FIG. 3 is a schematic, cross-sectional diagram showing a single-poly nonvolatile memory cell according to another embodiment. As shown in FIG. 3, the difference between the memory cell in FIG. 3 and the memory cell in FIG. 2 is that the memory cell in FIG. 3 has only one ion well 130 such as a low-voltage P well (LVPW) having the same doping concentration as that of the low-voltage P well formed in a low-voltage core logic circuit. The select gate transistor 11, the following gate transistor 12, and the antifuse varactor 13 are disposed within the ion well 130. A deep ion well 210 such as a deep N well (DNW) is formed under the ion well 130.

In another embodiment, the second ion well 132, as depicted in FIG. 2, may be added into the ion well 130.

Figure 4:
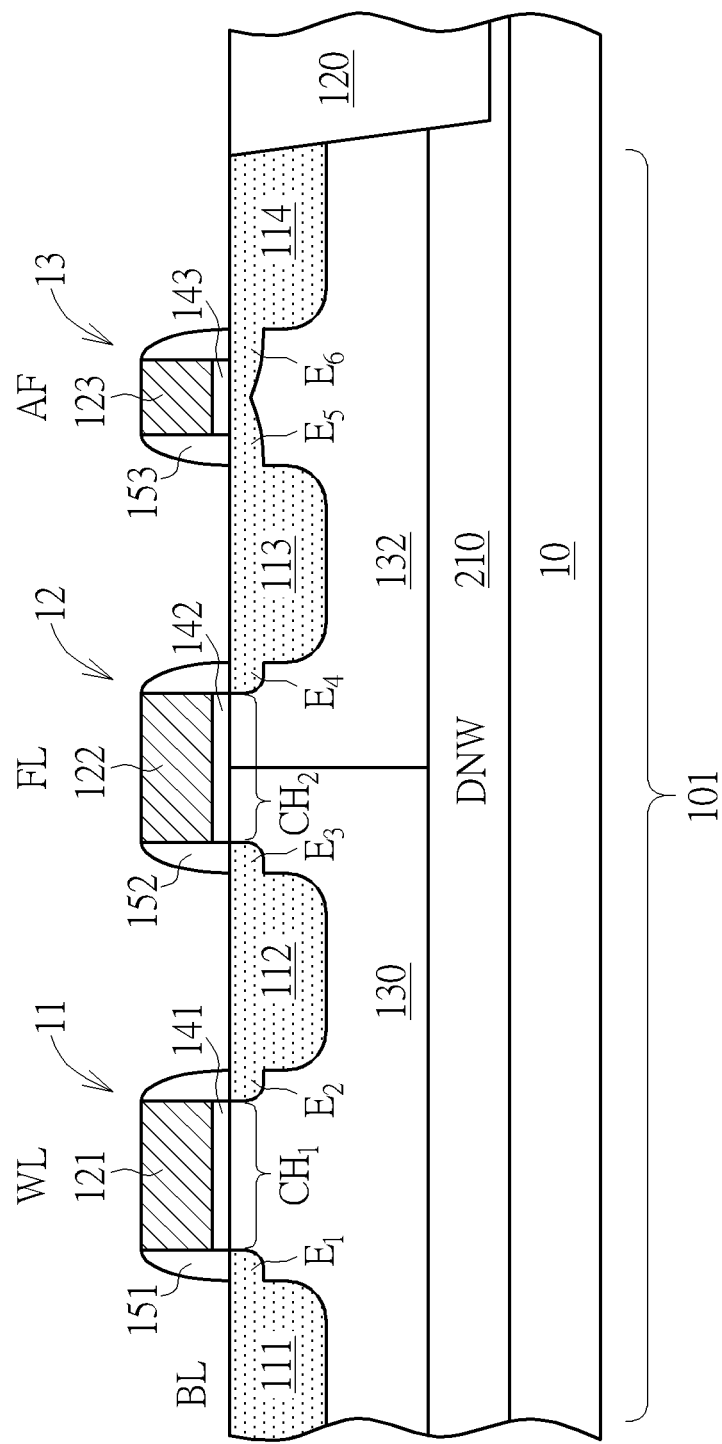
FIG. 4 is a schematic, cross-sectional diagram showing a single-poly nonvolatile memory cell according to still another embodiment.

As shown in FIG. 4, a second ion well 132 having the first conductivity type is disposed in the active area 101 within the DNW. The second ion well 132 is in contiguous with the first ion well 131. According to one embodiment of the invention, the following gate transistor 12 partially overlaps with the first ion well 131. According to one embodiment of the invention, the following gate transistor 12 also partially overlaps with the second ion well 132.

According to one embodiment of the invention, the second ion well 132 has a doping concentration that is smaller than that of the first ion well 131. For example, the second ion well 132 may be a medium-voltage P well (MV P well or MVPW) as that normally used in the logic core circuit region and may have a doping concentration of about 1E10 atoms/cm$^3$. For example, the first ion well 131 may be a low-voltage P well (LV P well or LVPW) as that normally used in the logic core circuit region and may have a doping concentration of about 1E11 atoms/cm$^3$.

According to one embodiment of the invention, the select gate transistor 11 is disposed within the first ion well 131. According to one embodiment of the invention, the antifuse varactor 13 is disposed within the second ion well 132.

The following gate 122 is disposed directly above a portion of the first ion well 131 and a portion of the second ion well 132. The second source/drain doped region 113, the fifth source/drain extension region $E_5$, the sixth source/drain extension region $E_5$, and the drain doped region 114 are disposed within the second ion well 132.

According to one embodiment of the invention, the following gate channel $CH_2$ is composed of a portion of the first ion well 131 and a portion of the second ion well 132.

Figure 5:
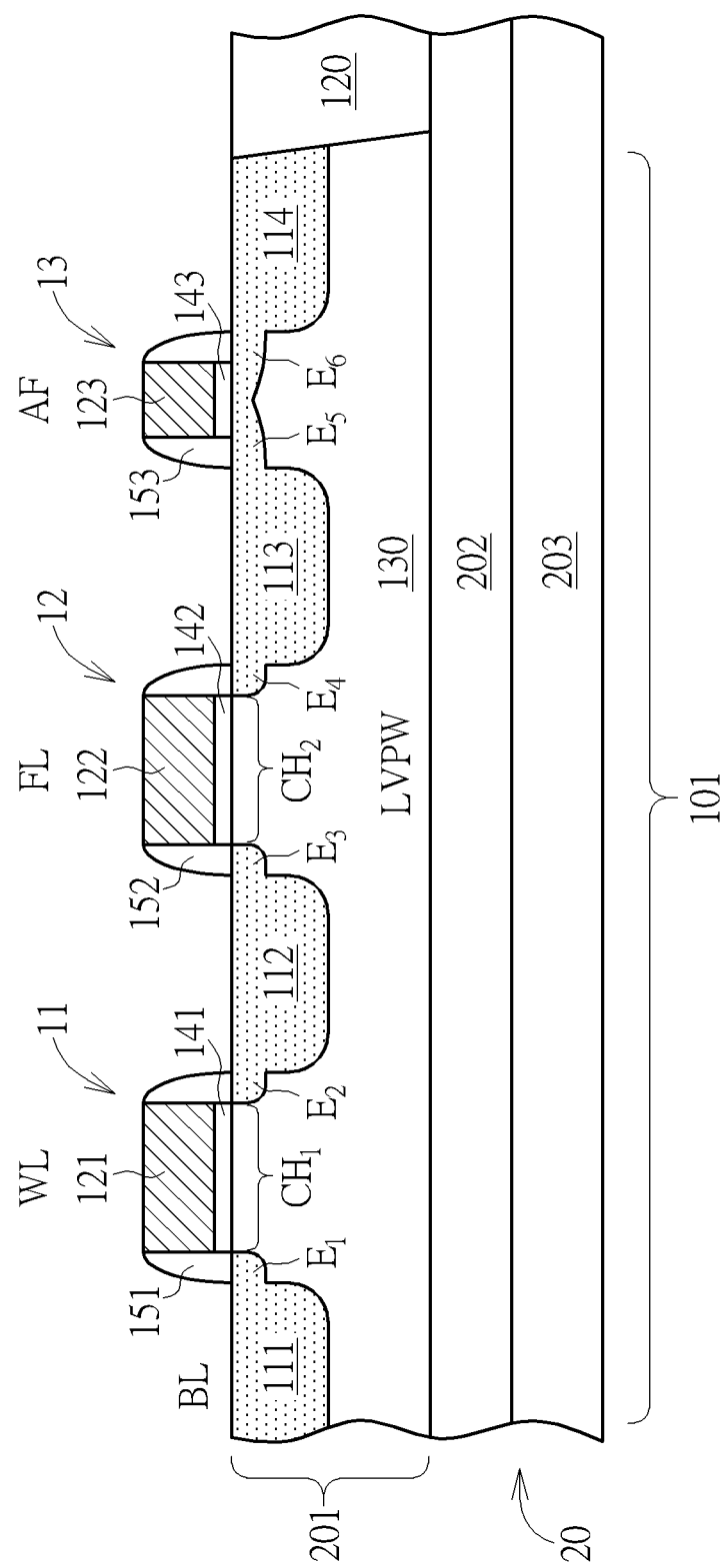
FIG. 5 is a schematic, cross-sectional diagram showing a single-poly nonvolatile memory cell according to still another embodiment.

FIG. 5 is a schematic, cross-sectional diagram showing a single-poly nonvolatile memory cell according to still another embodiment. As shown in FIG. 5, the difference between the memory cell in FIG. 5 and the memory cell in FIG. 2 is that the memory cell in FIG. 5 has only one ion well 130 such as a low-voltage P well (LVPW) having the same doping concentration as that of the low-voltage P well formed in a low-voltage core logic circuit. The select gate transistor 11, the following gate transistor 12, and the antifuse varactor 13 are disposed within the ion well 130. The select gate transistor 11, the following gate transistor 12, the antifuse varactor 13, and the ion well 130 are fabricated in a silicon layer 201 of a silicon-on-insulator (SOI) substrate 20. The SOI substrate 20 comprises the silicon layer 201, an insulator layer 202 under the silicon layer 201, and a base layer 203 such as a silicon base layer.

In another embodiment, the second ion well 132, as depicted in FIG. 2, may be added into the ion well 130.

Figure 6:
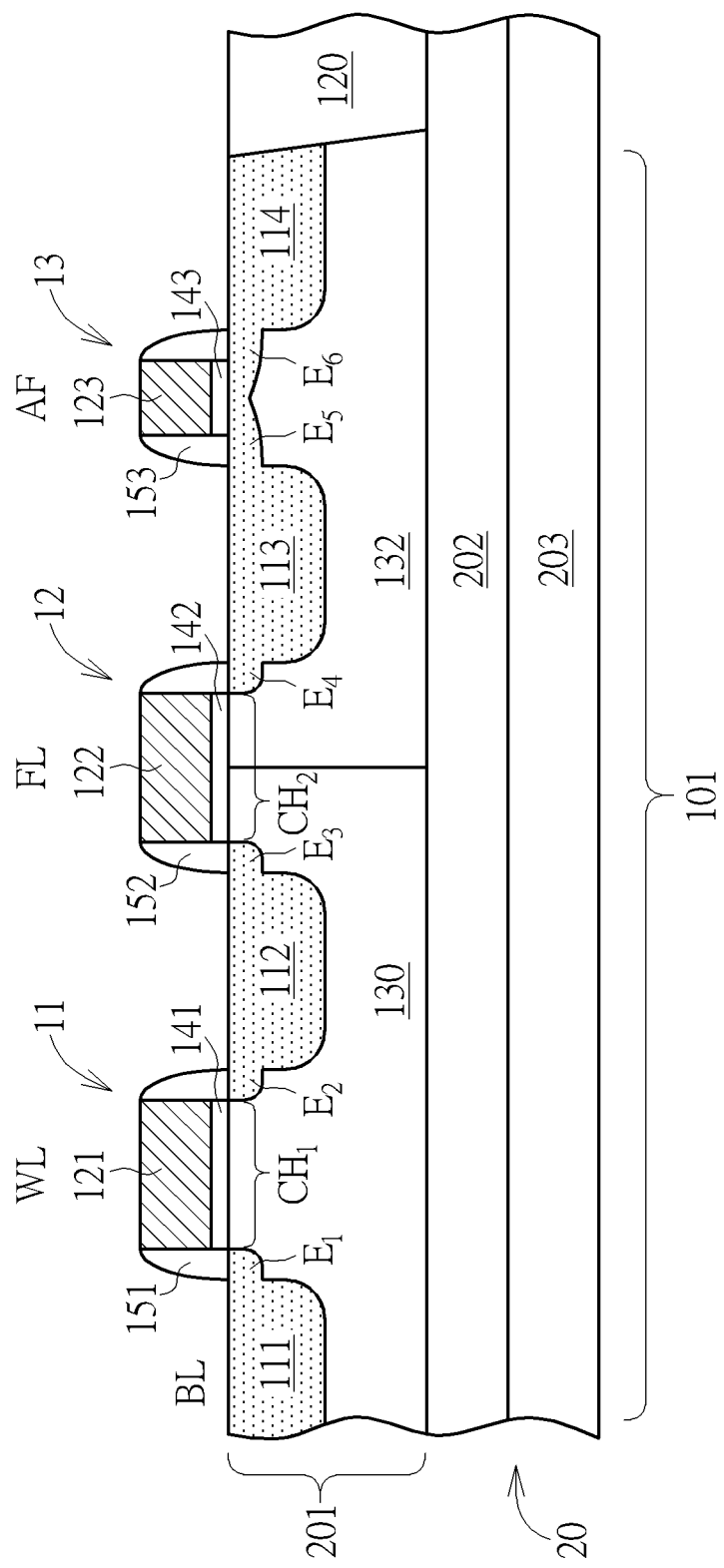
FIG. 6 is a schematic, cross-sectional diagram showing a single-poly nonvolatile memory cell according to still another embodiment.

FIG. 6 is a schematic, cross-sectional diagram showing a single-poly nonvolatile memory cell according to still another embodiment. As shown in FIG. 6, a second ion well 132 having the first conductivity type is disposed in the active area 101 in the silicon layer 201 of the SOI substrate 20. The second ion well 132 is in contiguous with the first ion well 131. According to one embodiment of the invention, the following gate transistor 12 partially overlaps with the first ion well 131. According to one embodiment of the invention, the following gate transistor 12 also partially overlaps with the second ion well 132.

According to one embodiment of the invention, the second ion well 132 has a doping concentration that is smaller than that of the first ion well 131. For example, the second ion well 132 may be a medium-voltage P well (MV P well or MVPW) as that normally used in the logic core circuit region and may have a doping concentration of about 1E10 atoms/cm$^3$. For example, the first ion well 131 may be a low-voltage P well (LV P well or LVPW) as that normally used in the logic core circuit region and may have a doping concentration of about 1E11 atoms/cm$^3$.

According to one embodiment of the invention, the select gate transistor 11 is disposed within the first ion well 131.

According to one embodiment of the invention, the antifuse varactor 13 is disposed within the second ion well 132.

The following gate 122 is disposed directly above a portion of the first ion well 131 and a portion of the second ion well 132. The second source/drain doped region 113, the fifth source/drain extension region $E_5$, the sixth source/drain extension region $E_5$, and the drain doped region 114 are disposed within the second ion well 132.

According to one embodiment of the invention, the following gate channel $CH_2$ is composed of a portion of the first ion well 131 and a portion of the second ion well 132.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-volatile memory cell, comprising:
   a silicon substrate having a first conductivity type, wherein the silicon substrate comprises an active area surrounded by a trench isolation region;
   a select gate transistor, a following gate transistor, and an antifuse varactor coupled in series on the active area, wherein the following gate transistor is disposed between the select gate transistor and the antifuse varactor;
   a first ion well having the first conductivity type in the active area, wherein the following gate transistor partially overlapping with the first ion well; and
   a second ion well having the first conductivity type in the active area, wherein the second ion well has a doping concentration that is smaller than that of the first ion well, and wherein the first ion well is not superimposed on the second ion well, and the second ion well is contiguous with the first ion well.

2. The non-volatile memory cell according to claim 1, wherein the following gate transistor partially overlapping with the second ion well.

3. The non-volatile memory cell according to claim 1, wherein the select gate transistor is disposed within the first ion well.

4. The non-volatile memory cell according to claim 1, wherein the antifuse varactor is disposed within the second ion well.

5. The non-volatile memory cell according to claim 1, wherein the first conductivity type is P type.

6. The non-volatile memory cell according to claim 5, wherein the first ion well is a low-voltage P well.

7. The non-volatile memory cell according to claim 6, wherein the second ion well is a medium-voltage P well.

8. The non-volatile memory cell according to claim 1, wherein the select gate transistor comprises a word line gate, a select gate oxide layer between the word line gate and the active area, a source doped region disposed on one side of the word line gate, a first source/drain doped region disposed on the other side of the word line gate, a first source/drain extension region coupled to the source doped region, a second source/drain extension region coupled to the first source/drain doped region, and a select gate channel between the first source/drain extension region and the second source/drain extension region.

9. The non-volatile memory cell according to claim 8, wherein the source doped region is electrically coupled to a bit line.

10. The non-volatile memory cell according to claim 8, wherein the source doped region and the first source/drain doped region have a second conductivity type that is opposite to the first conductivity type.

11. The non-volatile memory cell according to claim 10, wherein the following gate transistor comprises a following gate, a following gate oxide layer between the following gate and the active area, the first source/drain doped region adjacent to the following gate, a second source/drain doped region opposite to the first source/drain doped region, a third source/drain extension region coupled to the first source/drain doped region, a fourth source/drain extension region coupled to the second source/drain doped region, and a following gate channel between the third source/drain extension region and the fourth source/drain extension region.

12. The non-volatile memory cell according to claim 11, wherein the first source/drain doped region and the third source/drain extension region coupled to the first source/drain doped region are disposed within the first ion well.

13. The non-volatile memory cell according to claim 12, wherein the second source/drain doped region and the fourth source/drain extension region coupled to the second source/drain doped region are disposed within the second ion well.

14. The non-volatile memory cell according to claim 11, wherein the second source/drain doped region has the second conductivity type.

15. The non-volatile memory cell according to claim 11, wherein the following gate channel is composed of a portion of the first ion well and a portion of the second ion well.

16. The non-volatile memory cell according to claim 11, wherein the antifuse varactor comprises an antifuse gate, an antifuse gate oxide layer between the antifuse gate and the active area, the second source/drain doped region adjacent to the antifuse gate, a drain doped region opposite to the second source/drain doped region, a fifth source/drain extension region coupled with the second source/drain doped region, and a sixth source/drain extension region coupled with the drain doped region.

17. The non-volatile memory cell according to claim 16, wherein the fifth source/drain extension region merges with the sixth source/drain extension region underneath the antifuse gate.

18. The non-volatile memory cell according to claim 16, wherein the second source/drain doped region, the fifth source/drain extension region, the sixth source/drain extension region, and the drain doped region are disposed within the second ion well.

19. The non-volatile memory cell according to claim 16, wherein the drain doped region has the second conductivity type.

20. The non-volatile memory cell according to claim 8, wherein the source doped region and the first source/drain doped region are both disposed within the first ion well.

* * * * *